United States Patent [19]

Camras

[11] 3,911,493

[45] Oct. 7, 1975

[54] FLUTTER REDUCING TAPE DRIVE MECHANISM, PARTICULARLY FOR VIDEO READING DEVICES

[75] Inventor: Marvin Camras, Glencoe, Ill.

[73] Assignee: Illinois Institute of Technology, Chicago, Ill.

[22] Filed: Aug. 12, 1974

[21] Appl. No.: 496,868

Related U.S. Application Data

[60] Continuation of Ser. No. 393,908, Sept. 4, 1973, abandoned, and a continuation of Ser. No. 241,076, April 4, 1972, abandoned, which is a division of Ser. No. 30,564, April 21, 1970, Pat. No. 3,761,644, which is a division of Ser. No. 528,934, Feb. 21, 1966, abandoned, which is a continuation of Ser. No. 62,601, Aug. 10, 1970, Pat. No. 3,683,707.

[52] U.S. Cl. .................................. 360/90; 360/130

[51] Int. Cl. .......................................... G11b 15/00

[58] Field of Search .............. 226/187; 360/90, 130

[56] References Cited

UNITED STATES PATENTS 2,943,852 7/1960 Quirk .................................. 360/90

*Primary Examiner*—Vincent P. Canney

*Attorney, Agent, or Firm*—Hill, Gross, Simpson, Van Santen, Steadman, Chiara & Simpson

[57] ABSTRACT

A tape drive mechanism, particularly for video reading devices, in which tape flutter is reduced to an unobjectional minimum as a result of the geometric configuration of the tape path with respect to the tape transporting capstan, and the direction of pressure applied thereto, whereby undesired transverse movement of the capstan will not be transmitted to the tape in a direction promoting flutter at the tape head.

1 Claim, 4 Drawing Figures

FLUTTER REDUCING TAPE DRIVE MECHANISM, PARTICULARLY FOR VIDEO READING DEVICES

CROSS REFERENCES TO RELATED APPLICATIONS

The present application is a continuation of application Ser. No. 393,908, filed Sept. 4, 1973, (now abandoned), a continuation of application Ser. No. 241,076, filed Apr. 4, 1972 (now abandoned), which was a division of copending application Ser. No. 30,564, filed Apr. 21, 1970 (now U.S. Pat. No. 3,761,644 dated Sept. 25, 1973). Said application (Ser. No. 30,564, in turn, was a division of copending application Ser. No. 528,934, filed Feb. 21, 1966, which was abandoned in favor of continuation application Ser. No. 62,601, filed Aug. 10, 1970 (now U.S. Pat. No. 3,683,707, issued Aug. 8, 1972).

SUMMARY OF THE DISCLOSURE

The invention is directed to a tape drive mechanism, particularly for video tape, in which tape flutter is reduced to an unobjectionable minimum as a result of the geometric configuration of the tape path with respect to the tape transporting capstan and the direction of pressure applied thereto whereby any flutter of the capstan, due to slack or play in the bearings thereof will not be transmitted to the tape in a direction parallel to a portion of the tape path extending between the capstan and a transducer head adapted to be normally aligned on a transverse axis extending at right angle to the direction of movement of tape thereacross.

BRIEF DESCRIPTION OF THE DRAWING

Other objects, features and advantages of the present invention will be apparent from the following detailed description taken in connection with the accompanying drawings, in which.

DETAILED DESCRIPTION OF THE INVENTION

Figures 1, 2, 3, 4:
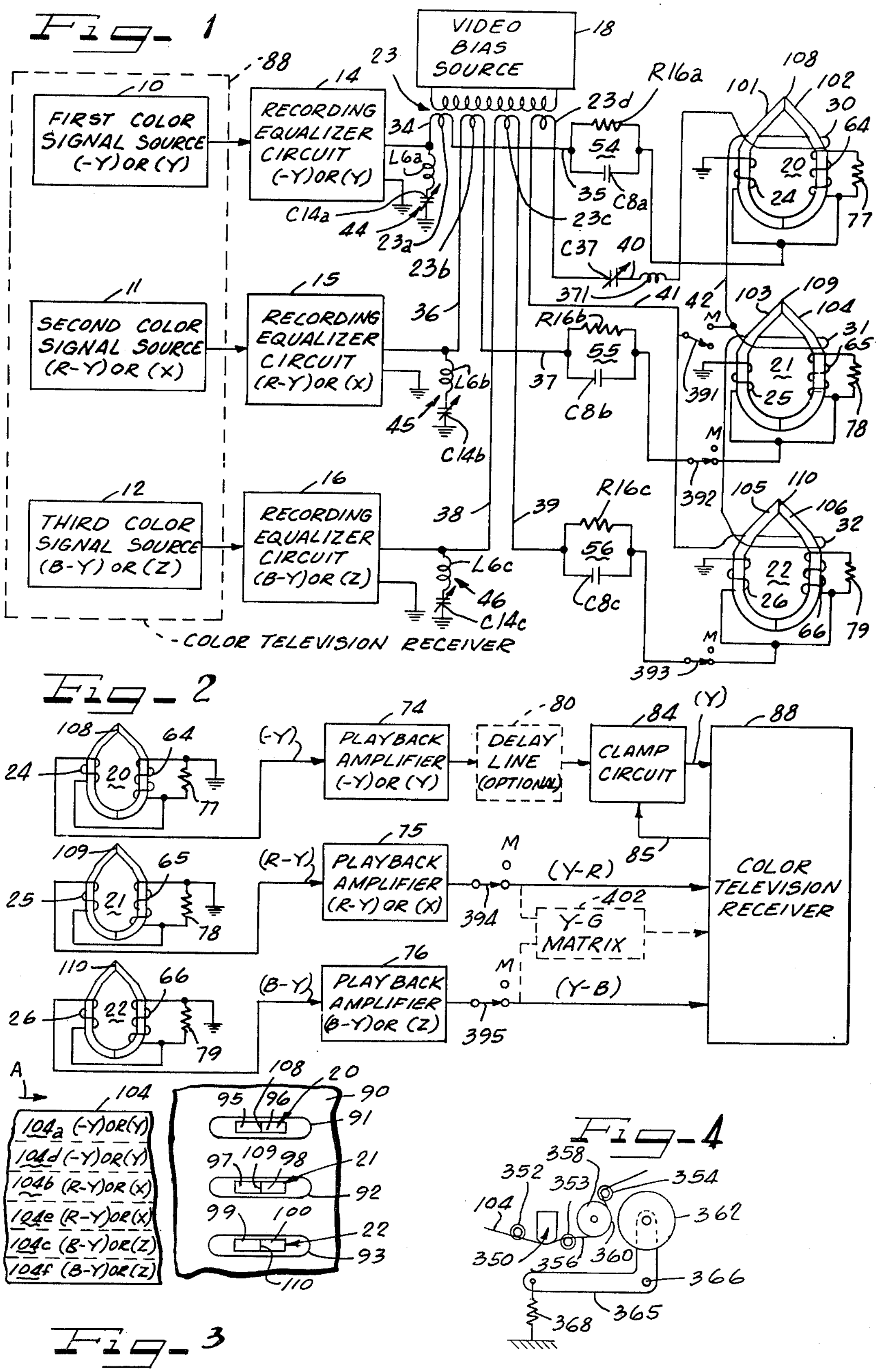
FIG. 1 is a diagrammatic view indicating a color television recording system in the present invention.
FIG. 2 is a diagrammatic illustration of a color television playback system in the present invention.
FIG. 3 is a diagrammatic partial plan view illustrating a transducer system for recording and playback of color television signals with which the present invention may be employed; and, FIG. 4 is a somewhat diagrammatic plan view of a preferred tape transport arrangement for the system of the present invention, the capstan pressure roll being indicated in its retracted position.

The present invention is adapted to be employed in a transducer system of the type illustrated in Camras Pat. No. 3,683,107, issued Aug. 8, 1972, wherein will be found a complete description of the system and of the present invention embodied therein, and which patent is hereby incorporated herein by reference.

FIGS. 1–3 illustrate a colored television recording system of a type to which the present invention is particularly applicable.

FIG. 1 illustrates in diagrammatic form a preferred color television recording system in accordance with the present invention. In this preferred system, demodulated color signals are obtained from suitable sources such as indicated at 10, 11 and 12. In one type of commercial broadcast receiver, as for example the RCA CTC16XH chassis, demodulated signals known as the minus Y (—Y) signal, the R minus Y (R—y) signal and the B minus T (B—Y) signal may be obtained, respectively, from the plate of a third video amplifier tube, from the plate of a R minus Y amplifier tube and from the plate of a B minus Y amplifier tube. In general the (—y) signal may be obtained from the cathode drive of commonly used three green color picture kinescopes, the (R—y) signal from the red grid drive, and the (B—Y) signal from the blue grid drive. Alternatively the undelayed (—Y) signal is obtained from the first video amplifier. Alternatively, suitable demodulated color components known as the Y signal, the X signal and the Z signal may be obtained from the grids of the monochrome amplifier and color amplifier tubes respectively, and the color signal sources 10, 11 and 12 may represent suitable sources of these signals in such receiver circuitry, as another example. The term "color television signal" as utilized herein refers to a signal which may be utilized in reconstructing a color image without regard to whether the signal represents the actual variation of intensity of a particular color component of a light image. Thus, the term color television signal as utilized herein comprehends the conventional Y or (—Y) signal which is found in present receiver circuitry.

Recording circuitry components 14–16 may comprise suitable equalizer circuits and optionally may include amplification circuitry.

In the preferred circuit arrangement, a component 18 is included for supplying a high frequency bias current to the respective head units indicated at 20, 21 and 22. By way of specific example, the source 18 has been indicated as energizing a transformer 23 which has respective secondary windings 23*a*, 23*b* and 23*c* interposed in series between the respective recording circuits 14–16 and the respective record windings 24, 25 and 26 of the head units. The video bias source 18 is also illustrated as energizing cross field conductors 30, 31 and 32 in series by means of a secondary winding 23*d*.

FIG. 2 illustrates a preferred playback arrangement including head units 20–22 which are identical to the head units of FIG. 1. During playback, the low impedance windings 24–26 are connected in series with high impedance windings 64–66 to supply respective reproduced signals to playback amplifiers 74–76. Resistors 77–79 are connected in parallel with the high impedance windings 64–66 and are for the purpose of dampening any resonance effects in the high impedance coil associated therewith. The input impedance of components 74, 75, 76 are designed to further damp the resonances in heads 20, 21, and 22.

As indicated in FIG. 2, the reproduced signals may represent respective demodulated color signal components such as a (—Y) component, a R minus Y component and a B minus Y component or may represent Y, X and Z components as previously mentioned, for example. A delay line component 80 may be optionally provided in the Y channel, the delay line in the monochrome portion of the broadcast receiver bring conveniently used. The three color component signals may be supplied to suitable points in a conventional color television receiver circuit, for example to the grid of a first video amplifier tube, to the grid of a R minus Y amplifier tube and to the grid of a B minus Y amplifier tube, respectively, where these are the signals normally present in such receiver circuitry. In the RCA CTC16XH the delay line in the monochrome circuit may be bypassed by supplying the (—Y) playback signal to the third video amplifier V708, and similarly the delay line may be bypassed in other receivers.

FIG. 2 illustrates a suitable head configuration for use with the invention. A housing 90 of magnetic shielding material may substantially completely enclose the head units 20–22, the tape engaging surface 90*a* of the housing having three elongated openings 91, 92 and 93. FIG. 7 for receiving the tape engaging pole faces 95–96, 97–98 and 99–100 (FIG. 3) of the respective head units 20, 21 and 22. The poles 101–102, 103–104 and 105–106 of (FIG. 1) of the head units providing the tape engaging surfaces 95–100 have transversely aligned transducing gaps 108–110 therebetween for coupling of the respective head units with a tape record medium such as indicated at 104.

FIG. 4 illustrates diagrammatically a preferred tape transport arrangement wherein the reference numeral 350 indicates a shiftable head assembly including the audio head 270 and the video head assembly contained within the housing 90. Preferably the head assembly 350 includes a (minus Y) head unit 20 located between the head units 21 and 22 and the head units have the dimensions previously described. The audio head unit or units of the head assembly 350 are then located as indicated in the fourth figure of my copending application Ser. 439,340 and as previously described.

Tape guides for the tape 104 are indicated at 352, 353 and 354 so as to provide a tape path portion 356 between the head assembly 350 and capstan 358 and a second tape path portion 360 where capstan pressure roller 362 acts. In accordance with an important concept of the present invention, it will be noted that the tape path portion 360 is directed generally at right angles relative to the tape path portion 356, and particularly that the capstan pressure roller 362 acts against the capstan 358 in a direction generally parallel to the tape path portion 356. More specifically, the capstan pressure roller 362 is illustrated as being mounted on an arm 365 which is pivotal on a pin 366 with the arm being urged in the counterclockwise direction by means of a tension spring 368 acting on the arm 356. In accordance with the present invention, the tension spring 368 exerts sufficient force so that the capstan roller 362 acts firmly against the capstan (through the tape 104) and prevents flutter of the capstan 358 in the direction of the tape path portion 356. It will be observed that any "play" in the bearings of the capstan 358 will thus result only in possible flutter of the capstan 358 in the general direction of the tape path portion 360 rather than in the direction of the tape path portion 356. Any flutter of the capstan 358 in the direction of the tape path portion 360 will not substantially affect the tape motion across the head assembly 350 because of the fact that such flutter is effectively at right angles to the direction of the tape path between the head assembly 350 and the capstan 358.

It will be apparent that many modifications and variations may be effected without departing from the scope of the novel concepts of the present invention.

I claim as my invention:

1. A tape drive arrangement for use in a video transducer system comprising a transducer head adapted to be normally aligned on a transverse axis extending at right angles to the direction of movement of a tape recording medium, operative to scan the latter, a rotatable capstan spaced from said transducer head and receiving said tape record medium about a portion of the periphery thereof, means defining a record medium path between the transducer head and the capstan including a first tape path portion approaching the capstan from the head which extends in a first general direction at the region where the record medium approaches contact with the capstan, means defining a second tape path portion which extends in a second general direction at the region where the record medium leaves contact with the capstan, the intermediate portion between said first and second path portions conforming to the periphery of said capstan for at least 90° of the circumference thereof, a capstan pressure roller disposed opposite said capstan at said intermediate record medium portion, the axes of said capstan and pressure roller extending parallel to one another with the common plane thereof extending substantially parallel to said first tape path, and means for urging said capstan pressure roller substantially in said plane and toward said capstan with sufficient force to prevent any substantial movement of said capstan in said plane, whereby any flutter of said capstan due to transverse slack or play thereof will only be in directions approximately 90° transverse to said plane and thus to said first tape path portion, having no material effect upon the movement of tape across said head.

* * * * *